US011241918B2

(12) United States Patent
Suzuki

(10) Patent No.: US 11,241,918 B2
(45) Date of Patent: Feb. 8, 2022

(54) PNEUMATIC TIRE

(71) Applicant: The Yokohama Rubber Co., LTD., Tokyo (JP)

(72) Inventor: Naoko Suzuki, Hiratsuka (JP)

(73) Assignee: The Yokohama Rubber Co., LTD.

(*) Notice: Subject to any disclaimer, the term of this patent is extended or adjusted under 35 U.S.C. 154(b) by 707 days.

(21) Appl. No.: 15/502,432

(22) PCT Filed: Aug. 27, 2015

(86) PCT No.: PCT/JP2015/074164
§ 371 (c)(1),
(2) Date: Feb. 7, 2017

(87) PCT Pub. No.: WO2016/035660
PCT Pub. Date: Mar. 10, 2016

(65) Prior Publication Data
US 2017/0232799 A1    Aug. 17, 2017

(30) Foreign Application Priority Data
Sep. 5, 2014 (JP) .............................. JP2014-181613

(51) Int. Cl.
*B60C 11/12* (2006.01)
*B60C 11/03* (2006.01)

(52) U.S. Cl.
CPC ...... *B60C 11/1204* (2013.01); *B60C 11/0304* (2013.01); *B60C 11/1236* (2013.01);
(Continued)

(58) Field of Classification Search
CPC ............. B60C 11/0304; B60C 11/1236; B60C 11/1204; B60C 2011/0383; B60C 2011/129
See application file for complete search history.

(56) References Cited

U.S. PATENT DOCUMENTS 2,272,879 A * 2/1942 Hargraves ........... B60C 11/0309
152/209.22
4,387,754 A * 6/1983 Mirtain ............... B60C 11/0306
152/209.1
(Continued)

FOREIGN PATENT DOCUMENTS

CN 102398478 A * 4/2012
JP 60-169305 A * 9/1985
(Continued)

OTHER PUBLICATIONS

Machine translation for Japan 05-162512 (Year: 2020).*
(Continued)

*Primary Examiner* — Steven D Maki
(74) *Attorney, Agent, or Firm* — Thorpe North & Western

(57) ABSTRACT

A pneumatic tire comprises an inner circumferential groove and an outer circumferential groove in a tread portion and extending in a tire circumferential direction. A land portion between circumferential grooves is defined by the inner and outer circumferential grooves. The pneumatic tire includes first and second auxiliary grooves disposed in the tire circumferential direction that communicate with the inner and outer circumferential grooves, respectively, and terminate within the land portion between circumferential grooves. The first auxiliary grooves and the second auxiliary grooves have a non-intersecting, alternating arrangement. At least one narrow groove is disposed between adjacent first auxiliary grooves. At least two narrow grooves are disposed between adjacent second auxiliary grooves. The at least two narrow grooves between second auxiliary grooves are disposed in a greater number than the number of the at least one narrow groove between first auxiliary grooves.

15 Claims, 6 Drawing Sheets

(52) U.S. Cl.
CPC .............. *B60C 2011/0346* (2013.01); *B60C 2011/0348* (2013.01); *B60C 2011/0383* (2013.01); *B60C 2011/0388* (2013.01); *B60C 2011/129* (2013.01)

(56) References Cited

U.S. PATENT DOCUMENTS

| | | | | |
|---|---|---|---|---|
| D740,208 | S * | 10/2015 | Rohweder | ................. D12/588 |
| 2006/0162832 | A1* | 7/2006 | Stuhldreher | ........ B60C 11/0306 |
| | | | | 152/209.18 |
| 2007/0272337 | A1* | 11/2007 | Bovaird | ................. B60C 11/12 |
| | | | | 152/209.18 |
| 2012/0168048 | A1 | 7/2012 | Suganuma | |
| 2014/0305563 | A1* | 10/2014 | Kujime | ............... B60C 11/1204 |
| | | | | 152/209.18 |
| 2017/0282651 | A1* | 10/2017 | Suzuki | ................. B60C 11/03 |

FOREIGN PATENT DOCUMENTS

| | | |
|---|---|---|
| JP | H03-079407 | 4/1991 |
| JP | 05-162512 A * | 6/1993 |
| JP | H07-081328 | 3/1995 |
| JP | 2000-158916 | 6/2000 |
| JP | 2010-006155 | 1/2010 |
| WO | WO 2010/147076 | 12/2010 |

OTHER PUBLICATIONS

Machine translation for China 102398478 (Year: 2020).*
Derwent abstract for China 102398478 (Year: 2020).*
Machine translation for Japan 60-169305 (Year: 2020).*
International Search Report for International Application No. PCT/JP2015/074164 dated Nov. 10, 2015, 4 pages, Japan.

* cited by examiner

PNEUMATIC TIRE

TECHNICAL FIELD

The present technology relates to a pneumatic tire.

BACKGROUND ART

Pneumatic tires with a tread pattern designed to improve steering stability performance and noise performance are known. Also, pneumatic tires with a tread pattern designed to improve traction performance on snow and ice and suppress uneven wear are known.

The pneumatic tire described in Japanese Unexamined Patent Application No. H07-081328A has been designed to reduce heel and toe wear in blocks and lugs of a tread pattern, the blocks and lugs being disposed at least in shoulder portions of a tread surface. This pneumatic tire is a pneumatic radial tire for a non-drive wheel with a designated rotation direction and includes the tread pattern provided with the blocks and lugs in at least the shoulder portions of the tread surface. A plurality of sipes extending in the tire width direction is disposed in each of the blocks and the lugs in the tire circumferential direction. The plurality of sipes have tire width direction components of varying lengths. The sipes are arranged from the trailing side to the leading side in the tire rotation direction in order from longest to shortest.

The pneumatic tire of Japanese Unexamined Patent Application No. H07-081328A is capable of suppressing uneven wear on the trailing end side (kick up side) by dispersing the increased friction force experienced on the trailing end side when brakes are applied. However, the pneumatic tire has insufficient running performance on dry road surfaces and snow-covered road surfaces.

SUMMARY

The present technology provides a pneumatic tire that achieves good wear resistance performance on dry road surfaces and good running performance on wet road surfaces and snow-covered road surfaces in a compatible manner.

A pneumatic tire according to an aspect of the present technology comprises:

an inner circumferential groove and an outer circumferential groove provided in a tread portion and extending in a tire circumferential direction;

a land portion between circumferential grooves defined by the inner circumferential groove and the outer circumferential groove;

the land portion between circumferential grooves being provided with:

a plurality of first auxiliary grooves disposed in the tire circumferential direction that communicate with the inner circumferential groove and terminate within the land portion between circumferential grooves, and a plurality of second auxiliary grooves disposed in the tire circumferential direction that communicate with the outer circumferential groove and terminate within the land portion between circumferential grooves, wherein the plurality of first auxiliary grooves and the plurality of second auxiliary grooves have a non-intersecting alternating arrangement;

at least one narrow groove between first auxiliary grooves disposed between adjacent first auxiliary grooves of the plurality of first auxiliary grooves; and at least two narrow grooves between second auxiliary grooves disposed between adjacent second auxiliary grooves of the plurality of second auxiliary grooves, the at least two narrow grooves between second auxiliary grooves being disposed in a greater number than the number of the at least one narrow groove between first auxiliary grooves.

Preferably, the at least two narrow grooves between second auxiliary grooves have different lengths determined by their position between adjacent second auxiliary grooves of the plurality of second auxiliary grooves, with a longer narrow groove coming into contact with a ground before a shorter narrow groove when traveling in a forward direction.

Preferably, the longer narrow groove of the at least two narrow grooves between second auxiliary grooves has a length a such that:

$$0.4*W2 \leq a \leq 0.7*W2$$

where W2 is a length of the plurality of second auxiliary grooves disposed in the land portion between circumferential grooves.

Preferably, $0.7 a \leq b \leq 0.9 a$ is satisfied, where a is a length of a longer narrow groove of the at least two narrow grooves between second auxiliary grooves with different lengths, and b is a length of a shorter narrow groove of the at least two narrow grooves between second auxiliary grooves.

Preferably, the at least two narrow grooves between second auxiliary grooves have a curved shape.

Preferably, the at least one narrow groove between first auxiliary grooves has a curved shape;

the curved shape of the at least one narrow groove between first auxiliary grooves and the curved shape of the at least two narrow grooves between second auxiliary grooves are disposed such that a protruding direction of one of the curved shapes faces a tire rotation direction and a recessing direction of the other curved shape faces the tire rotation direction; and distances in the tire circumferential direction between end portions on both sides in a tire width direction are shorter than a distance in the tire circumferential direction between centers in the tire width direction.

Preferably, $W1 \leq W2$ is satisfied, where W1 is a length of the plurality of first auxiliary grooves disposed in the land portion between circumferential grooves, and W2 is a length of the plurality of second auxiliary grooves disposed in the land portion between circumferential grooves.

Preferably, the plurality of first auxiliary grooves are disposed on a vehicle outer side in the tire width direction, and the plurality of second auxiliary grooves are disposed on a vehicle inner side in the tire width direction when the pneumatic tire is mounted on a vehicle.

Preferably, the land portion between circumferential grooves is located on a tire equatorial plane.

Preferably, the at least one narrow groove between first auxiliary grooves and the at least two narrow grooves between second auxiliary grooves have a groove width of from 0.4 mm to 1.2 mm.

According to the pneumatic tire according to the present technology, good wear resistance performance on dry road surfaces and good running performance on wet road surfaces and snow-covered road surfaces can be achieved in a compatible manner.

DETAILED DESCRIPTION

An embodiment of the present technology is described in detail below with reference to the drawings. However, the present technology is not limited by the embodiment. Furthermore, components of the embodiment include components that may be easily replaced by those skilled in the art or that are substantially identical to components of the embodiment. Furthermore, a plurality of modified examples described in the embodiment may be combined as desired within the scope apparent to those skilled in the art.

Figure 1:
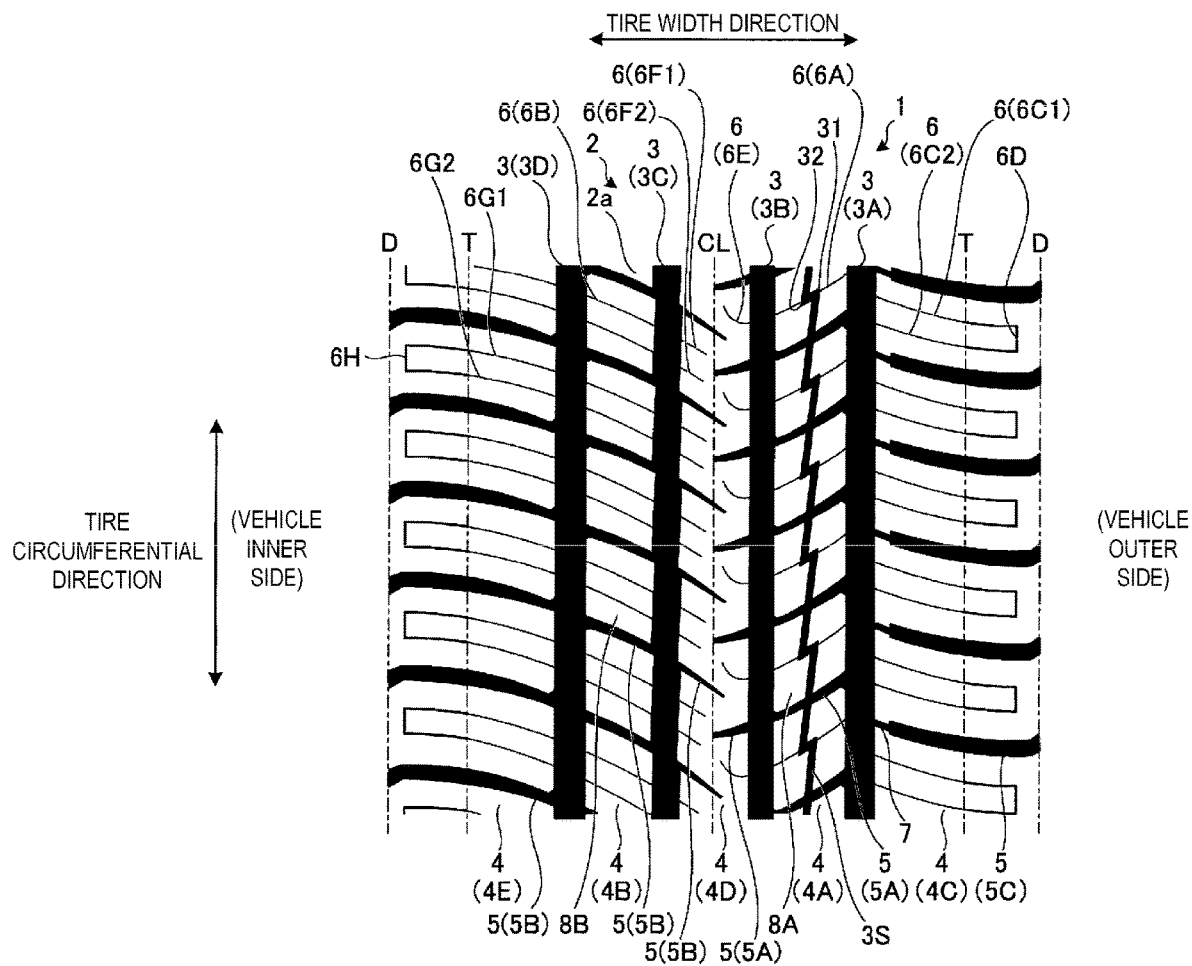
FIG. 1 is a plan view of a pneumatic tire according to an embodiment of the technology.

FIG. 1 is a plan view of a pneumatic tire according to the embodiment.

In the description below, "tire circumferential direction" refers to a circumferential direction with the rotational axis (not illustrated) as the center axis. "Tire width direction" refers to a direction parallel to the rotational axis. "Inward in the tire width direction" refers to the direction toward a tire equatorial plane (tire equatorial line) CL in the tire width direction, and "outward in the tire width direction" refers to the direction away from the tire equatorial plane CL in the tire width direction. "Tire equatorial plane CL" is a plane orthogonal to the rotational axis of the pneumatic tire 1 that passes through the center of the tire width of a pneumatic tire 1. "Tire equator line" refers to a line aligned with the circumferential direction of the pneumatic tire 1 that lies on the tire equatorial plane CL. In the embodiment, the tire equator line and the tire equatorial plane share the reference sign CL.

The pneumatic tire 1 of the present embodiment includes a tread portion 2, as illustrated in FIG. 1. The tread portion 2 is made of a rubber material, and is exposed at an outermost side of the pneumatic tire 1 in the tire radial direction. The surface of the tread portion 2 is defined as a tread surface 2a that serves as a profile of the pneumatic tire 1. The pneumatic tire 1 of the present embodiment has a designated vehicle inner/outer side orientation which may be designated by indicators provided on the sidewall portions to indicate the vehicle inner/outer side orientation of the pneumatic tire 1 when mounted to a vehicle, for example. Note that the designations of the vehicle inner side and the vehicle outer side are not limited to cases in which the pneumatic tire 1 is mounted to a vehicle. For example, in cases in which the pneumatic tire 1 is assembled on a rim, orientation of the rim with respect to the inner side and the outer side of the vehicle in the tire width direction is predetermined. Thus, in cases in which the pneumatic tire 1 is assembled on a rim, the orientation with respect to the vehicle inner side and the vehicle outer side in the tire width direction is designated.

The tread portion 2 is provided with a plurality of circumferential grooves 3 (four in the present embodiment) in the tread surface 2a. The circumferential grooves 3 extend in the tire circumferential direction and are disposed side by side in the tire width direction. In the present embodiment, two circumferential grooves 3 are disposed on either side of the tire equatorial plane CL. Of the two circumferential grooves 3 disposed on the vehicle outer side distanced from the tire equatorial plane CL, one located on the vehicle outer side is defined as a first circumferential groove 3A, and the other located on the vehicle inner side is defined as a second circumferential groove (inner circumferential groove) 3B. Of the two circumferential grooves 3 disposed on the vehicle inner side distanced from the tire equatorial plane CL, one located on the vehicle outer side is defined as a third circumferential groove (outer circumferential groove) 3C, and the other located on the vehicle inner side is defined as a fourth circumferential groove 3D. The third circumferential groove 3C has a narrower groove width (groove opening width in the tire width direction) than the other circumferential grooves 3 (3A, 3B, 3D). Additionally, a circumferential narrow groove 3S is disposed between the first circumferential groove 3A and the second circumferential groove 3B. As such, the tread portion 2 has an asymmetrical configuration about the tire equatorial plane CL. The circumferential grooves 3, for example, have a groove width of from 5 mm to 15 mm and a groove depth (a dimension from the position of opening to the tread surface 2a to the groove bottom) of from 5 mm to 15 mm. Note that in the present specification, the first circumferential groove 3A, the second circumferential groove 3B, the third circumferential groove 3C, and the fourth circumferential groove 3D may also be referred to as main grooves.

In the tread surface 2a of the tread portion 2, a plurality of land portions 4 (five in the present embodiment) are defined in the tire width direction by the circumferential grooves 3. The land portion 4 located between the first circumferential groove 3A and the second circumferential groove 3B is defined as a first land portion 4A. The land portion 4 located between the third circumferential groove 3C and the fourth circumferential groove 3D is defined as a second land portion 4B. The land portion 4 located on the vehicle outer side (outward in the tire width direction) of the first land portion 4A is defined as a third land portion 4C. The land portion 4 located on the tire equatorial plane CL between the second circumferential groove 3B and the third circumferential groove 3C is defined as a fourth land portion (land portion between circumferential grooves) 4D. The land portion 4 located on the vehicle inner side (outward in the tire width direction) of the fourth circumferential groove 3D is defined as a fifth land portion 4E.

In the land portions 4, a plurality of auxiliary grooves 5 and a plurality of narrow grooves 6 are disposed in the tread surface 2a in a circumferentially side by side configuration. The auxiliary grooves 5 and the narrow grooves 6 extend in a direction that intersects the tire circumferential direction. The narrow grooves 6 each have a groove width of from 0.4 mm to 1.2 mm and a groove depth of equal to or less than the groove depth of the circumferential grooves 3, for example. The auxiliary grooves 5 each have a groove width of from 0.5 mm to the groove width of the circumferential grooves 3 and a groove depth equal to or less than the groove depth of the circumferential grooves 3, for example.

The auxiliary grooves 5 include a first auxiliary groove 5A, a second auxiliary groove 5B, and a third auxiliary groove 5C.

The first auxiliary groove 5A communicates with the first circumferential groove 3A, passes through the second circumferential groove 3B and the circumferential narrow groove 3S and terminates in the fourth land portion 4D. The second auxiliary groove 5B passes through the third circumferential groove 3C and the fourth circumferential groove 3D running through the fifth land portion 4E, which is located on the shoulder portion on the vehicle inner side, and the second land portion 4B before terminating in the center fourth land portion 4D. In other words, the second auxiliary groove 5B starts at one end at a design end D and terminates at the other end in the center fourth land portion 4D. The design end D is located on the vehicle inner side of a ground contact edge T in the fifth land portion 4E, which is located on the shoulder portion on the vehicle inner side.

The first auxiliary groove 5A and the second auxiliary groove 5B gradually increase in groove width as they extend away from the center fourth land portion 4D. As a result, water drainage properties are increased. This allows an effect of improving braking performance on wet road surfaces to be obtained.

Here, "ground contact edge T" refers to the two outermost edges of a ground contact region in the tire width direction. In FIG. 1, the ground contact edges T are depicted as being continuous in the tire circumferential direction. The ground contact region is a region where the tread surface 2a of the tread portion 2 of the pneumatic tire 1 comes into contact with the road surface, when the pneumatic tire 1 is assembled on a regular rim, inflated to a regular internal pressure, and loaded with 70% of a regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). The "regular internal pressure" refers to "maximum air pressure" stipulated by JATMA, a maximum value in "tire load limits at various cold inflation pressures" stipulated by TRA, or "inflation pressures" stipulated by ETRTO. Note that "regular load" refers to "maximum load capacity" defined by JATMA, a maximum value in "tire load limits at various cold inflation pressures" defined by TRA, and "load capacity" defined by ETRTO. "Design end D" refers to the outermost edges of the tread portion 2 in the tire width direction and the outermost edges in the tire width direction where the auxiliary grooves 5 or narrow grooves 6 are disposed. In FIG. 1, the design ends D are depicted as being continuous in the tire circumferential direction.

In FIG. 1, the first auxiliary groove 5A and the second auxiliary groove 5B incline with opposite orientations with respect to the tire width direction and curve to opposite sides. Note that although not illustrated in the drawings, the first auxiliary groove 5A and the second auxiliary groove 5B may have a configuration in which one extends aligned with the tire width direction and the other is inclined with respect to the tire width direction.

The third auxiliary groove 5C is disposed in the third land portion 4C with an end portion distanced from the first circumferential groove 3A located furthest to the vehicle outer side. Specifically, the third auxiliary groove 5C starts at one end at the design end D located on the vehicle outer side of the ground contact edge T in the third land portion 4C and terminates at the other end in the third land portion 4C at a position distanced from the first circumferential groove 3A. The third auxiliary groove 5C inclines with the same orientation with respect to the tire width direction as the second auxiliary groove 5B but curves to the opposite side.

Note that the third auxiliary groove 5C terminates distanced from the first circumferential groove 3A. A decorative groove 7 is disposed between the terminating end of the third auxiliary groove 5C and the first circumferential groove 3A. The decorative groove 7 has a groove width and a groove depth equal to or less than that of the third auxiliary groove 5C. The decorative groove 7 is worn away in the initial period of the service life of the pneumatic tire 1.

By disposing the third auxiliary grooves 5C, the edge effect from the third auxiliary grooves 5C allows an effect of improving braking performance on snow-covered road surfaces to be obtained. Additionally, by disposing the end portion of the third auxiliary groove 5C distanced from the first circumferential groove 3A, rigidity of the third land portion 4C is improved. This allows an effect of improving braking performance on dry road surfaces to be obtained.

The tread portion 2 includes, in the first land portion 4A, a plurality of first blocks 8A. The first blocks 8A are defined by the first circumferential groove 3A and the second circumferential groove 3B and the plurality of first auxiliary grooves 5A. Additionally, the tread portion 2 includes, in the second land portion 4B, a plurality of second blocks 8B. The second blocks 8B are defined by the third circumferential groove 3C and the fourth circumferential groove 3D and the plurality of second auxiliary grooves 5B.

Furthermore, the narrow grooves 6 include a first narrow groove 6A, a second narrow groove 6B, third narrow grooves 6C1 and 6C2, a fourth narrow groove 6D, a fifth narrow groove 6E, sixth narrow grooves 6F1 and 6F2, seventh narrow grooves 6G1 and 6G2, and an eighth narrow groove 6H.

The first narrow grooves 6A are disposed between first auxiliary grooves 5A adjacent in the tire circumferential direction. The first narrow groove 6A communicates with the first circumferential groove 3A at one end and communicates with the second circumferential groove 3B at the other end. The first narrow grooves 6A pass through middle portions between the first auxiliary grooves 5A, i.e. central portions of the first blocks 8A.

The second narrow grooves 6B are disposed in the second blocks 8B and incline with the same orientation with respect to the tire width direction as the second auxiliary grooves 5B and curve to the same side. A plurality (two in the present embodiment) of the second narrow grooves 6B are disposed as one set. The second narrow grooves 6B communicate with the third circumferential groove 3C at one end and communicate with the fourth circumferential groove 3D at the other end.

The third narrow grooves 6C1 and 6C2 are disposed in the third land portion 4C between third auxiliary grooves 5C adjacent in the tire circumferential direction. The third narrow grooves 6C1 and 6C2 incline with the same orientation with respect to the tire width direction as the third auxiliary grooves 5C and curve to the same side. A plurality (two in the present embodiment) of the third narrow grooves 6C (6C1 and 6C2) are disposed as one set. The third narrow grooves 6C1 and 6C2 communicate with the first circumferential groove 3A at one end portion and are connected together at the other end portion via the fourth narrow groove 6D at a position outward from the ground contact edge T in the tire width direction.

By disposing the third narrow grooves 6C1 and 6C2, the edge effect improves. This allows an effect of improving braking performance on snow-covered road surfaces to be obtained. Additionally, by disposing a plurality of the third narrow grooves 6C as one set side by side in the tire circumferential direction, the edge effect is further improved. This further allows an effect of improving braking performance on snow-covered road surfaces to be obtained. Furthermore, by having the configuration in which one set of the plurality of third narrow grooves 6C disposed side by side in the tire circumferential direction are connected at the other end portions in the third land portion 4C on the vehicle outer side, water drainage properties are improved. This allows an effect of improving braking performance on wet road surfaces to be obtained. Note that by the third narrow grooves 6C1 and 6C2 having a curving configuration, the edge effect is further improved. This allows an effect of improving braking performance on snow-covered road surfaces to be obtained.

At least one fifth narrow groove (narrow grooves between first auxiliary grooves) 6E is disposed between adjacent first auxiliary grooves 5A in the fourth land portion 4D.

The sixth narrow grooves (narrow grooves between second auxiliary grooves) 6F1 and 6F2 are disposed between adjacent second auxiliary grooves 5B in the fourth land portion 4D.

The seventh narrow grooves 6G1 and 6G2 are disposed in the fifth land portion 4E between second auxiliary grooves 5B adjacent in the tire circumferential direction. The seventh narrow grooves 6G1 and 6G2 incline with the same orientation with respect to the tire width direction as the second auxiliary grooves 5B and curve to the same side. A plurality (two in the present embodiment) of the seventh narrow grooves 6G (6G1 and 6G2) are disposed as one set. The seventh narrow grooves 6G1 and 6G2 communicate with the fourth circumferential groove 3D at one end portion and are connected together at the other end portion via the eighth narrow groove 6H at a position outward from the ground contact edge T in the tire width direction.

Note that the fifth narrow groove 6F1, the second narrow groove 6B, and the seventh narrow groove 6G1 may be formed as a continuous groove passing through the third circumferential groove 3C and the fourth circumferential groove 3D or may be disposed separately. Additionally, note that the fifth narrow groove 6F2, the second narrow groove 6B, and the seventh narrow groove 6G2 may be formed as a continuous groove passing through the third circumferential groove 3C and the fourth circumferential groove 3D or may be disposed separately.

The tread portion 2, in the tread surface 2a of the first land portion 4A, is provided with the circumferential narrow groove 3S extending in a zigzag manner in the tire circumferential direction. The zigzag shape of the circumferential narrow groove 3S is formed by a first bent-back portion 31 and a second bent-back portion 32 disposed in an alternating arrangement. The second bent-back portion 32 bends back to the side opposite the side the first bent-back portion 31 bends back to. The first bent-back portion 31 and the second bent-back portion 32 of the circumferential narrow groove 3S are centrally located in the first block 8A. "Centrally located in the first block 8A" in terms of the position of the first bent-back portion 31 and the second bent-back portion 32 means located within a 25% or less range from the center of the first block 8A in the tire width direction. In other words, the first bent-back portion 31 and the second bent-back portion 32 are located within a distance 25% or less of the distance in the tire width direction from the center of the first block 8A to the first circumferential groove 3A, within a distance 25% or less of the distance in the tire width direction from the center of the first block 8A to the second circumferential groove 3B, and within a distance 25% or less of the distance in the tire circumferential direction from the center of the first block 8A to the first auxiliary grooves 5A.

The first narrow groove 6A intersects a portion of the circumferential narrow groove 3S located between the first bent-back portion 31 and the second bent-back portion 32. Additionally, within each first block 8A, the portion of the circumferential narrow groove 3S located between the first bent-back portion 31 and the second bent-back portion 32 that includes the portion intersected by the first narrow groove 6A is shorter than all other portions. Note that the circumferential narrow groove 3S has a groove width equal to or less than the other circumferential grooves 3A, 3B, 3C, 3D of 0.5 mm or greater, for example, and a groove depth equal to or less than the other circumferential grooves 3A, 3B, 3C, 3D.

Figure 2:
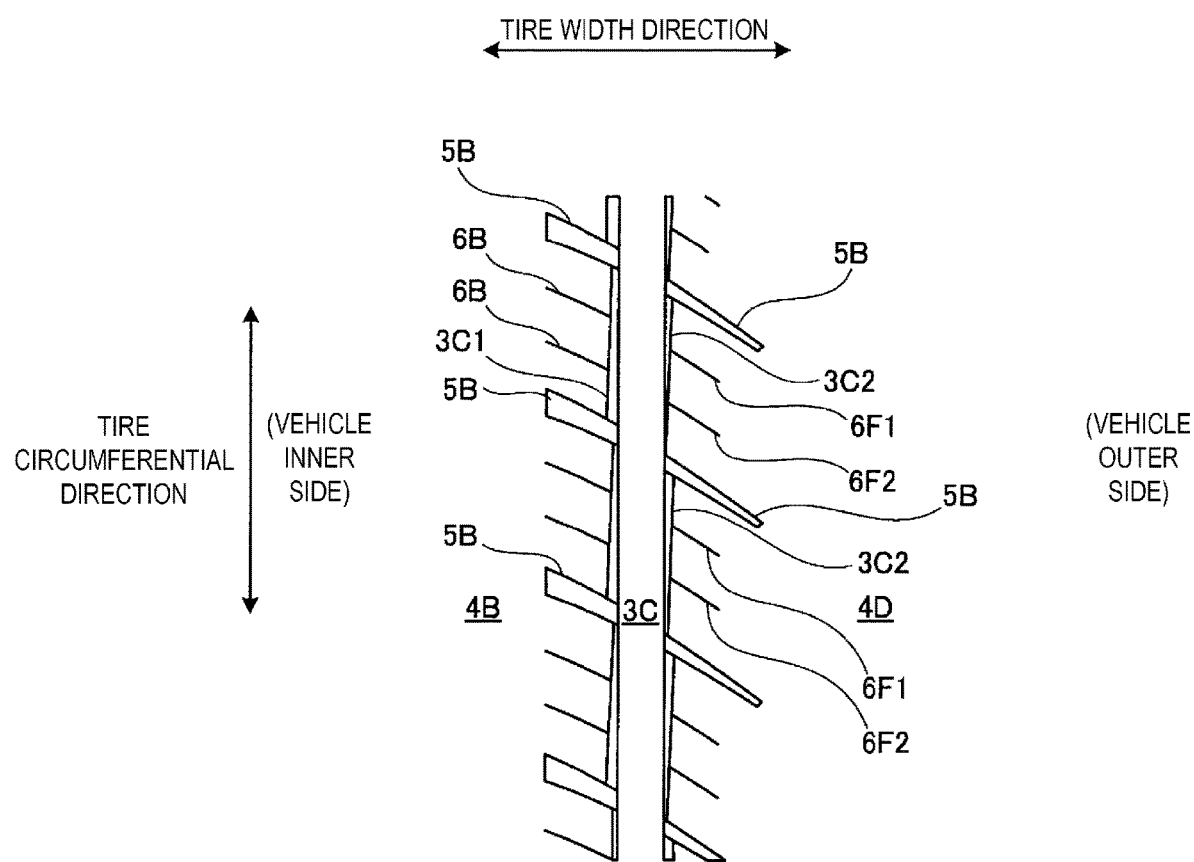
FIG. 2 is an enlarged plan view of a portion of the pneumatic tire according the embodiment of the present technology.

FIG. 2 is an enlarged plan view of a portion, specifically a region near the third circumferential groove 3C, of the pneumatic tire according to the present embodiment.

As illustrated in FIG. 2, in the pneumatic tire 1 of the present embodiment, chamfers 3C1, 3C2 are provided on the opening edges on both sides of the third circumferential groove 3C in the tire width direction. The chamfer 3C1 is provided on the opening edge of the third circumferential groove 3C proximal to the second land portion 4B. The chamfer width gradually changes between adjacent second auxiliary grooves 5B so that the chamfer 3C1 forms a substantially triangular shape. Additionally, the chamfer 3C2 is provided on the opening edge of the third circumferential groove 3C proximal to the fourth land portion 4D. The chamfer width gradually changes along the tire circumferential direction between adjacent second auxiliary grooves 5B so that the chamfer 3C1 forms a substantially triangular shape. The chamfers 3C1, 3C2 are provided on the opening edges of the third circumferential groove 3C on respective sides and have a configuration such that the respective substantially triangular shapes formed by the chamfer width gradually changing are reversed. Note that although not illustrated in the drawings, the chamfers 3C1, 3C2 may have a chamfer width such that the chamfers 3C1, 3C2 run parallel to the tire circumferential direction.

Figure 3:
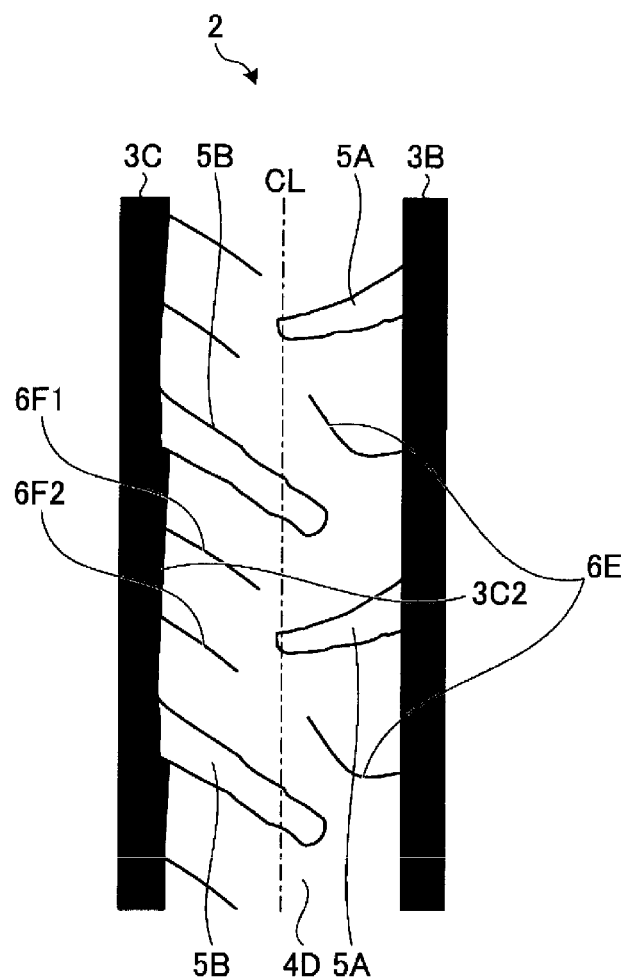
FIG. 3 is an enlarged plan view of a portion of the pneumatic tire according to the embodiment of the present technology.

FIG. 3 is an enlarged plan view of a portion, specifically a region near the fourth land portion 4D, of the pneumatic tire according to the present embodiment.

As illustrated in FIG. 3, in the pneumatic tire 1 of the present embodiment, a plurality of the first auxiliary grooves 5A are disposed in the fourth land portion 4D in the tire circumferential direction and terminate within the fourth land portion 4D. Additionally, in the pneumatic tire 1 of the present embodiment, a plurality of the second auxiliary grooves 5B are disposed in the fourth land portion 4D in the tire circumferential direction and terminate within the fourth land portion 4D. In the fourth land portion 4D, the first auxiliary grooves 5A and the second auxiliary grooves 5B do not intersect and have an alternating arrangement.

Additionally, in the fourth land portion 4D, at least one fifth narrow groove 6E is disposed between adjacent first auxiliary grooves 5A. In the present embodiment, one fifth narrow groove 6E is disposed.

Additionally, in the fourth land portion 4D, the sixth narrow grooves 6F1 and 6F2 are disposed between adjacent second auxiliary grooves 5B in a number greater than the number of fifth narrow grooves 6E disposed. In the present embodiment, two sixth narrow grooves 6F (6F1, 6F2) are disposed.

By having a configuration in which the number of narrow grooves to one side of the tire equatorial plane CL is less than the other, rigidity is increased in that direction.

Referring to FIG. 3 again, in the present embodiment, at least two sixth narrow grooves with different lengths (6F1, 6F2) are disposed in the fourth land portion 4D. In the present embodiment, when a vehicle travels forward and the tire rotates, of the two sixth narrow grooves 6F1, 6F2, it is the longer sixth narrow groove 6F1 that comes into contact with the ground before the shorter sixth narrow groove 6F2. In other words, the sixth narrow grooves 6F1, 6F2 have different lengths determined by their position between adjacent second auxiliary grooves 5B, with the length of the sixth narrow groove 6F2, which comes into contact with the ground after when the vehicle travels forward, being shorter than the length of the sixth narrow groove 6F1, which comes into contact with the ground before. As a result of this configuration, braking performance on snow-covered road surfaces can be improved and braking performance on dry road surface can be maintained. Note that in the present embodiment, the length of the grooves is the length of a center line that joins the midpoints of the groove widths.

The longer sixth narrow groove 6F1 preferably has a length a such that:

$$0.4*W2 \leq a \leq 0.7*W2$$

where W2 is the length of the second auxiliary grooves 5B disposed in the fourth land portion 4D. The sixth narrow groove 6F1 preferably has a shorter length than adjacent second auxiliary grooves 5B, and in particular preferably has a length which is approximately 50% of the length of the adjacent second auxiliary grooves 5B. If the length of the sixth narrow groove 6F1 is greater than this, block rigidity decreases, resulting in braking performance on dry road surfaces decreasing.

Additionally, the following relationship is preferably satisfied:

$$0.7a \leq b \leq 0.9a$$

where a is the length of the longer sixth narrow groove 6F1 of the two sixth narrow grooves 6F1, 6F2, and b is the length of the shorter sixth narrow groove 6F2. In particular, of two adjacent sixth narrow grooves 6F1, 6F2, the length of the shorter sixth narrow groove 6F2 is preferably approximately 80% of the length of the longer sixth narrow groove 6F1.

Note that the shape of the fifth narrow grooves 6E and the sixth narrow grooves 6F1 and 6F2 may be rectilinear or may be curved. In particular, the shape of the fifth narrow grooves 6E and the sixth narrow grooves 6F1 and 6F2 is preferably arcuate. By having an arcuate form, the blocks can be supported, and thus braking performance on snow-covered road surfaces can be improved.

The orientation of the curved shape in a case in which the fifth narrow grooves 6E and the sixth narrow grooves 6F1 and 6F2 have a curved shape is explained below while referencing FIGS. 4A and 4B.

Figure 4A:
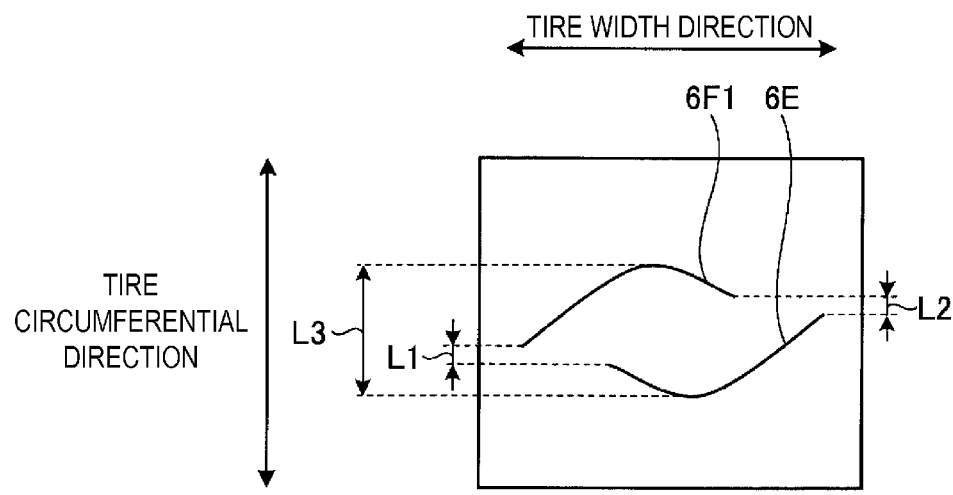
FIG. 4A is a diagram for explaining the relationship between the orientation of the shape of fifth narrow grooves and the orientation of the shape of sixth narrow grooves.
Figure 4B:
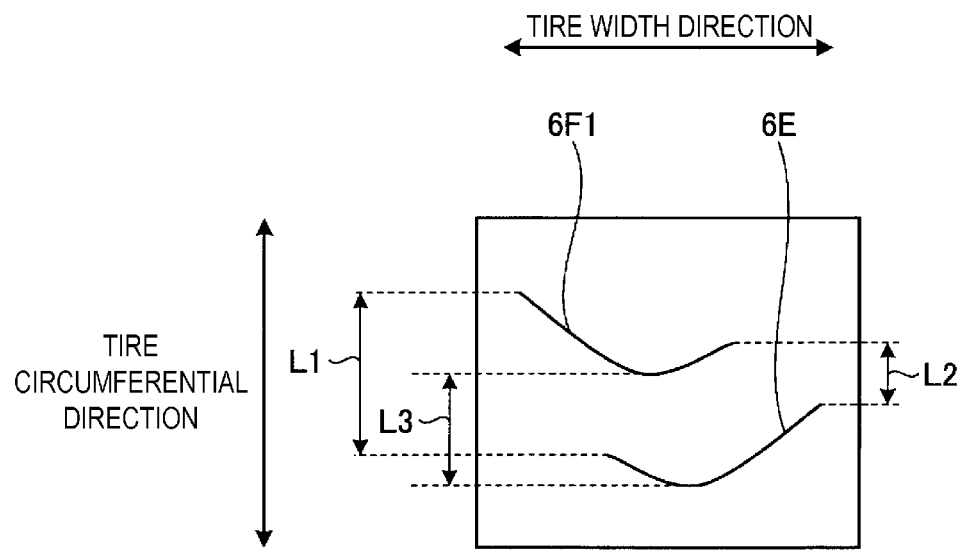
FIG. 4B is a diagram for explaining the relationship between the orientation of the shape of the fifth narrow grooves and the orientation of the shape of the sixth narrow grooves.

FIGS. 4A and 4B are diagrams for explaining the relationship between the orientation of the shape of the fifth narrow grooves 6E and the orientation of the shape of the sixth narrow grooves 6F1, 6F2.

As illustrated in FIG. 4A, the curved shape of the fifth narrow groove 6E and the curved shape of the sixth narrow groove 6F1, 6F2 face each other with opposing orientations. In other words, one from among the fifth narrow groove 6E and the sixth narrow groove 6F1 is disposed with the protruding direction of its curved shape orientated toward the tire rotation direction, and the other is disposed with the recessing direction of its curved shape orientated toward the tire rotation direction. In a similar manner, one from among the fifth narrow groove 6E and the sixth narrow groove 6F2 is disposed with the protruding direction of its curved shape orientated toward the tire rotation direction, and the other is disposed with the recessing direction of its curved shape orientated toward the tire rotation direction. With the fifth narrow groove 6E and the sixth narrow groove 6F1 in this configuration, distances L1, L2 in the tire circumferential direction between end portions on either side in the tire width direction are shorter than a distance L3 in the tire circumferential direction between the centers in the tire width direction.

In FIG. 4B, the fifth narrow groove 6E and the sixth narrow groove 6F1 are disposed so that the recessing direction of their curved shapes faces toward the tire rotation direction. With this configuration, the fifth narrow groove 6E and the sixth narrow groove 6F1 are disposed such that the distance L2 in the tire circumferential direction between the end portions on one side in the tire width direction is less than the distance L3 in the tire circumferential direction between the centers in the tire width direction, and the distance L1 in the tire circumferential direction between end portions on the other side in the tire width direction is greater than the distance L3 in the tire circumferential direction between the centers in the tire width direction. The configuration illustrated in FIG. 4B in which the fifth narrow groove 6E and the sixth narrow groove 6F1 have their recessing direction of their curved shape facing the same direction is not preferable. The configuration illustrated in FIG. 4A in which the fifth narrow groove 6E and the sixth narrow groove 6F1 have an opposite orientation with the protruding direction of one of the curved shapes facing the tire rotation direction and the recessing direction of the other of the curved shapes facing the tire rotation direction is preferable. The fifth narrow groove 6E and the sixth narrow groove 6F2 have a similar relationship.

By disposing the fifth narrow grooves 6E and the sixth narrow grooves 6F1, 6F2 in an oppositely orientated configuration with one arranged with the protruding direction of its curved shape orientated toward the tire rotation direction, and the other arranged with the recessing direction of its curved shape orientated toward the tire rotation direction, as illustrated in FIG. 4A, adjacent narrow grooves can support each other. This allows braking performance on dry road surfaces to be improved without braking performance on snow-covered road surfaces being decreased.

Returning to FIG. 3, the following relationship is preferably satisfied:

$$W1 \leq W2$$

where W1 is the length of the first auxiliary groove 5A disposed in the fourth land portion 4D, and W2 is the length of the second auxiliary groove 5B disposed in the fourth land portion 4D. By satisfying this relationship, rigidity on the vehicle inner side and vehicle outer side of the tire equatorial plane CL can be varied. This allows braking performance on dry road surfaces, in particular performance when turning, to be improved.

Additionally, the first auxiliary groove 5A is preferably disposed on the vehicle outer side and the second auxiliary groove 5B is preferably disposed on the vehicle inner side. This configuration can increase rigidity on the vehicle outer side, thus allowing braking performance on dry road surfaces, in particular performance when turning, to be improved.

Modified examples of the pneumatic tire 1 according to the present embodiment are described below with reference to FIGS. 5, 6, and 7.

Figure 5:
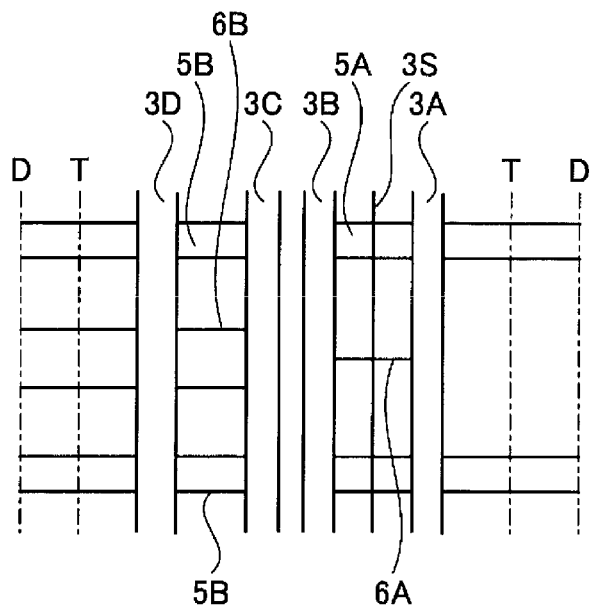
FIG. 5 is a schematic view of a modified example of the pneumatic tire of FIG. 1.

FIG. 5 is a schematic view of the configuration illustrated in FIG. 1. Referring to FIG. 5, the circumferential narrow groove 3S is disposed between the first circumferential groove 3A and the second circumferential groove 3B. The first auxiliary groove 5A communicates with the first circumferential groove 3A and the second circumferential groove 3B. The first narrow groove 6A is disposed between adjacent first auxiliary grooves 5A. The first narrow groove 6A passes through the circumferential narrow groove 3S.

The second auxiliary groove 5B communicates with the third circumferential groove 3C and the fourth circumferential groove 3D. The second narrow groove 6B is disposed between adjacent second auxiliary grooves 5B. According to such a configuration, braking performance on snow-covered road surfaces when traveling straight and when cornering (turning) can be stabilized.

Figure 6:
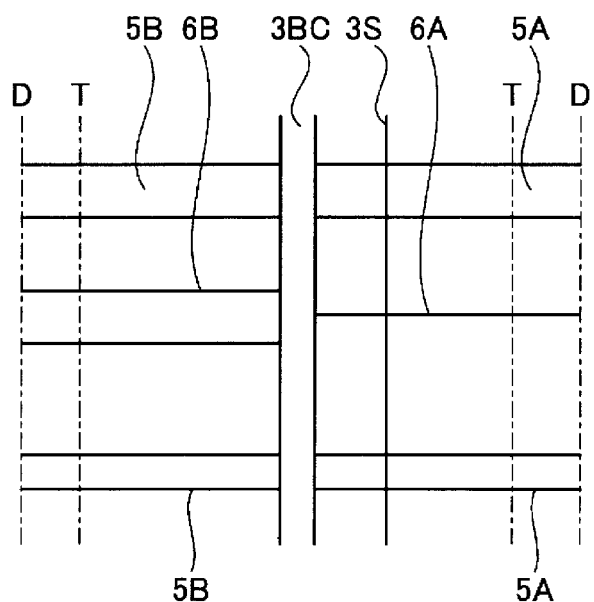
FIG. 6 is a schematic view of a modified example of the pneumatic tire according to the embodiment of the present technology.

FIG. 6 is a schematic view of a modified example in which one circumferential groove is disposed. Referring to FIG. 6, the difference between the pneumatic tire of this modified example and the pneumatic tire illustrated in FIG. 5 is that a circumferential narrow groove 3BC is disposed instead of the second circumferential groove 3B and the third circumferential groove 3C.

In the configuration illustrated in FIG. 6, the circumferential narrow groove 3BC is the only circumferential groove except for the circumferential narrow groove 3S. In the configuration illustrated in FIG. 6, the first narrow groove 6A is disposed between adjacent first auxiliary grooves 5A and passes through the circumferential narrow groove 3S. The second narrow groove 6B is disposed between adjacent second auxiliary grooves 5B. According to such a configuration, braking performance on snow-covered road surfaces when traveling straight and when cornering can be stabilized.

Figure 7:
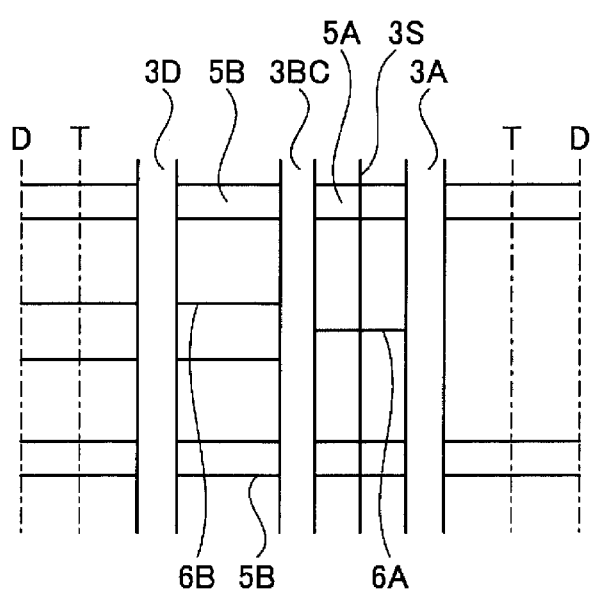
FIG. 7 is a schematic view of a modified example of the pneumatic tire according to the embodiment of the present technology.

FIG. 7 is a schematic view of a modified example in which three circumferential grooves are disposed. Referring to FIG. 7, the difference between the pneumatic tire of this modified example and the pneumatic tire illustrated in FIG. 5 is that the circumferential narrow groove 3BC is disposed instead of the second circumferential groove 3B and the third circumferential groove 3C.

In the configuration illustrated in FIG. 7, the first circumferential groove 3A, the circumferential narrow groove 3BC, and the fourth circumferential groove 3D are the only circumferential grooves except for the circumferential narrow groove 3S. In the configuration illustrated in FIG. 7, the first narrow groove 6A is disposed between adjacent first auxiliary grooves 5A and passes through the circumferential narrow groove 3S. The second narrow groove 6B is disposed between adjacent second auxiliary grooves 5B. According to such a configuration, braking performance on snow-covered road surfaces when traveling straight and when cornering can be stabilized.

The pneumatic tire 1 of the present embodiment as described above includes a tread portion 2 which is asymmetric about the tire equatorial plane CL. The tread portion 2 is provided with the first land portion 4A disposed outward from the tire equatorial plane CL in the tire width direction, and the second land portion 4B disposed inward from the tire equatorial plane CL in the tire width direction. The first land portion 4A is provided with the circumferential narrow groove 3S extending in the circumferential direction, the plurality of first auxiliary grooves 5A that pass through the circumferential narrow groove 3S and are disposed at periodic intervals in the circumferential direction, the plurality of first blocks 8A defined by the plurality of first auxiliary grooves 5A, and the plurality of first narrow grooves 6A that pass through the circumferential narrow groove 3S and are disposed in the first blocks 8A. The second land portion 4B is provided with the plurality of second auxiliary grooves 5B disposed at periodic intervals in the circumferential direction, the second blocks 8B defined by the plurality of second auxiliary grooves 5B, and the plurality of second narrow grooves 6B disposed in the second blocks 8B. The number of second narrow grooves 6B is greater than the number of first narrow grooves 6A per respective block.

According to the pneumatic tire 1, by disposing a circumferential narrow groove in a land portion located on an outer side, braking performance on snow-covered road surfaces when traveling straight and when cornering can be stabilized and an effect of improving braking performance on wet road surfaces can be obtained.

Additionally, in the pneumatic tire 1 of the present embodiment, the circumferential narrow groove 3S has a zigzag shape with the first bent-back portion 31 and the second bent-back portion 32, which bends back to the side opposite the side the first bent-back portion 31 bends back to, disposed in an alternating arrangement. The first bent-back portion 31 and the second bent-back portion 32 are centrally located in the first block 8A.

According to the pneumatic tire 1, the circumferential narrow groove 3S having a zigzag shape with more edges than a straight shape results in being able to improve the edge effect. This allows an effect of improving braking performance on snow-covered road surfaces to be obtained. Also, by centrally disposing the bent-back portions of the zigzag in the land portion, block rigidity can be maintained better than if the bent-back portions are located near the ends of the land portion.

Additionally, in the pneumatic tire 1 of the present embodiment, in each first block 8A, the portion of the circumferential narrow groove 3S between the first bent-back portion 31 and the second bent-back portion 32 is intersected by the first narrow groove 6A, and the portion between the first bent-back portion 31 and the second bent-back portion 32 which includes the portion intersected by the first narrow groove 6A is shorter than all other portions.

According to the pneumatic tire 1, by centrally disposing a zigzag portion in a block and having it intersected by a narrow groove, the block can be divided in four substantially even parts, thus enabling rigidity in all directions to be maintained and braking performance on dry road surfaces to be maintained.

Additionally, in the pneumatic tire 1 of the present embodiment, the tread portion 2 is further provided with the first circumferential groove 3A disposed outward of the first land portion 4A in the tire width direction, and the third land portion 4C disposed outward of the first circumferential groove 3A in the tire width direction. The third land portion 4C is provided with the third auxiliary groove 5C which does not communicate with the first circumferential groove 3A.

According to the pneumatic tire 1, by providing an auxiliary groove in an outer land portion that does not communicate with a circumferential groove, an effect of improving braking performance on snow-covered road surfaces can be obtained, and by forming a rib, block rigidity can be increased, thus improving braking performance on dry road surfaces.

Additionally, in the pneumatic tire 1 of the present embodiment, the plurality of third auxiliary grooves 5C are disposed in the tire circumferential direction. The third land portion 4C is provided with at least two third narrow grooves 6C (6C1 and 6C2) between adjacent third auxiliary grooves 5C, the third narrow grooves 6C communicating with the first circumferential groove 3A at one end; and the fourth narrow grooves 6D which extend in the circumferential direction and connect the at least two third narrow grooves 6C (6C1, 6C2) disposed between adjacent third auxiliary grooves 5C at the other end.

According to the pneumatic tire 1, by disposing at least two narrow grooves, an edge effect can be rendered within the land portion. This increase braking performance on snow-covered road surfaces and water drainage properties.

Additionally, the pneumatic tire 1 of the present embodiment includes a tread portion 2. The tread portion 2 is provided with the first circumferential groove 3A disposed at the outer end portion of the first land portion 4A in the tire width direction and defined thereby, the second circumferential groove 3B disposed at the inner end portion of the first land portion 4A in the tire width direction and defined thereby, the third circumferential groove 3C disposed at the inner end portion of the second land portion 4B and defined thereby, and the fourth circumferential groove 3D disposed at the outer end portion of the second land portion 4B and defined thereby. The first land portion 4A is defined by the first circumferential groove 3A and the second circumferential groove 3B, which is disposed closer to the tire equatorial plane CL than the first circumferential groove 3A. The second land portion 4B is defined by the third circumferential groove 3C, which is disposed closer to the tire equatorial plane CL than the second land portion 4B, and the fourth circumferential groove 3D, which is disposed outward of the second land portion 4B in the tire width direction. The fourth land portion 4D is located on the tire equatorial plane CL and is defined by the second circumferential groove 3B and the third circumferential groove 3C. The first auxiliary groove 5A passes through the second circumferential groove 3B and extends to and terminates within the fourth land portion 4D. The second auxiliary groove 5B passes through the third circumferential groove 3C and extends to and terminates within the fourth land portion 4D.

The pneumatic tire 1 includes four circumferential grooves and a land portion on the tire equatorial plane CL. By having such a configuration, a rib is formed in the center land portion of the tread surface instead of blocks. This enables braking performance on dry road surfaces to be improved.

Additionally, in the pneumatic tire 1 of the present embodiment, the chamfers 3C1, 3C2 are provided on the opening edges on both sides of the third circumferential groove 3C in the tire width direction.

By disposing the chamfers, the edge effect increases. This allows an effect of improving braking performance on snow-covered road surfaces to be obtained. In particular, by providing the third circumferential groove with chamfers, braking performance on snow-covered road surfaces can be effectively improved.

Additionally, in the pneumatic tire 1 of the present embodiment, the chamfers 3C1, 3C2 gradually change in chamfer width between adjacent second auxiliary grooves 5B as they extend in the tire circumferential direction and have a reversed opening edge shape on opposite sides of the third circumferential groove 3C.

According to the pneumatic tire 1, by making the chamfers different from one another with the opening edge shape being reversed on opposite sides of the third circumferential groove, snow discharge properties improve. This allows an effect of improving braking performance on snow-covered road surfaces to be obtained.

Additionally, in the pneumatic tire 1 of the present embodiment, in the fourth land portion 4D, the position where the first auxiliary groove 5A, which passes through the second circumferential groove 3B, terminates and the position where the second auxiliary groove 5B, which passes through the third circumferential groove 3C, terminates have an alternating arrangement in the tire circumferential direction.

According to the pneumatic tire 1, good wear resistance performance on dry road surfaces and good braking performance on wet road surfaces and snow-covered road surfaces can be achieved in a compatible manner.

Additionally, in the pneumatic tire 1 of the present embodiment, the fourth land portion 4D is defined by the second circumferential groove 3B and the third circumferential groove 3C, the plurality of first auxiliary grooves 5A are disposed in the tire circumferential direction and terminate in the fourth land portion 4D, the plurality of second auxiliary groove 5B are disposed in the tire circumferential direction and terminate within the fourth land portion 4D. The first auxiliary grooves 5A and the second auxiliary grooves 5B have an alternating arrangement in which they do not intersect. At least one fifth narrow groove 6E is disposed between adjacent first auxiliary grooves 5A. A number of sixth narrow grooves 6F (6F1, 6F2) greater than the number of fifth narrow grooves 6E are disposed between adjacent second auxiliary grooves 5B.

According to the pneumatic tire 1, good wear resistance performance on dry road surfaces and good braking performance on wet road surfaces and snow-covered road surfaces can be achieved in a compatible manner.

Additionally, in the pneumatic tire 1 of the present embodiment, the sixth narrow grooves 6F1, 6F2 have different lengths determined by their position between adjacent second auxiliary grooves 5B with the longer groove coming into contact with the ground before the shorter groove when traveling in a forward direction.

According to the pneumatic tire 1, braking performance on snow-covered road surfaces can be improved and braking performance on dry road surface can be maintained.

Additionally, in the pneumatic tire 1 of the present embodiment, the longer sixth narrow groove 6F1 has a length a such that:

$$0.4*W2 \leq a \leq 0.7*W2$$

where W2 is the length of the second auxiliary grooves 5B disposed in the fourth land portion 4D.

According to the pneumatic tire 1, block rigidity and braking performance on dry road surfaces can be maintained.

Additionally, in the pneumatic tire 1 of the present embodiment, the following relationship is satisfied:

$$0.7a \leq b \leq 0.9a$$

where a is the length of the longer sixth narrow groove 6F1 of the two sixth narrow grooves 6F1, 6F2, and b is the length of the shorter sixth narrow groove 6F2.

According to the pneumatic tire 1, block rigidity and braking performance on dry road surfaces can be maintained.

Additionally, in the pneumatic tire 1 of the present embodiment, the sixth narrow grooves 6F1, 6F2 have a curved shape.

According to the pneumatic tire 1, the blocks can be supported, and thus braking performance on snow-covered road surfaces can be improved.

Additionally, in the pneumatic tire 1 of the present embodiment, the shape of the fifth narrow groove 6E is a curved shape. The curved shape of the fifth narrow groove 6E and the curved shape of the sixth narrow groove 6F1, 6F2 are disposed such that the protruding direction of one of the curved shapes faces the tire rotation direction and the recessing direction of the other one of the curved shapes faces the tire rotation direction. The distances in the tire circumferential direction between end portions on both sides are shorter than the distance in the tire circumferential direction between the centers in the tire width direction.

According to the pneumatic tire 1, the narrow grooves can support each other, and thus braking performance on dry road surfaces can be improved without braking performance on snow-covered road surfaces being reduced.

Additionally, in the pneumatic tire 1 of the present embodiment, the following relationship is satisfied:

$$W1 \leq W2$$

where W1 is the length of the first auxiliary groove 5A disposed in the fourth land portion 4D, and W2 is the length of the second auxiliary groove 5B disposed in the fourth land portion 4D.

According to the pneumatic tire 1, rigidity on the vehicle inner side and vehicle outer side of the tire equatorial plane CL can be varied. This allows braking performance on dry road surfaces, in particular performance when turning, to be improved.

Additionally, in the pneumatic tire 1 of the present embodiment, the first auxiliary groove 5A is disposed on the vehicle outer side in the tire width direction and the second auxiliary groove 5B is disposed on the vehicle inner side in the tire width direction.

According to the pneumatic tire 1, by increasing the rigidity on the vehicle outer side, braking performance on dry road surfaces, in particular performance when turning, can be improved.

Additionally, in the pneumatic tire 1 of the present embodiment, the first auxiliary groove 5A and the second auxiliary groove 5B are disposed in the fourth land portion 4D.

According to the pneumatic tire 1, by centrally disposing a first auxiliary groove and a second auxiliary groove in a tread surface, wear resistance performance on dry road surfaces and braking performance on wet road surfaces and snow-covered road surfaces can be improved in a compatible manner.

Additionally, in the pneumatic tire 1 of the present embodiment, the fifth land portion 4E is disposed inward of the fourth circumferential groove 3D in the tire width direction. The second auxiliary groove 5B passes through the fifth land portion 4E and the fourth circumferential groove 3D.

According to the pneumatic tire 1, by increasing the rigidity on the vehicle outer side, braking performance on dry road surfaces, in particular performance when turning, can be improved.

Additionally, in the pneumatic tire 1 of the present embodiment, the plurality of second auxiliary grooves 5B are disposed in the tire circumferential direction. At least two seventh narrow grooves 6G (6G1, 6G2) are provided between adjacent second auxiliary grooves 5B. The at least two seventh narrow grooves 6G (6G1, 6G2) communicate with the fourth circumferential groove 3D at one end and are connected by the eighth narrow groove 6H, which extends in the circumferential direction, at the other end.

According to the pneumatic tire 1, by disposing at least two narrow grooves, an edge effect can be rendered within the land portion. This increase braking performance on snow-covered road surfaces and water drainage properties.

Additionally, in the pneumatic tire 1 of the present embodiment, the first narrow groove 6A, the second narrow groove 6B, the third narrow grooves 6C1 and 6C2, the fourth narrow groove 6D, the seventh narrow grooves 6G1, 6G2, the eighth narrow groove 6H, the fifth narrow groove 6E, and the sixth narrow grooves 6F1 and 6F2 have a groove width of from 0.4 mm to 1.2 mm.

According to the pneumatic tire 1, the narrow grooves are equivalent to sipes. This allows the edge effect to be increased and thus an effect of improving braking performance on snow-covered road surfaces to be obtained.

EXAMPLES

In the examples, performance tests for braking performance on wet road surfaces, braking performance on snow-covered road surfaces, and braking performance on dry road surfaces were performed on a plurality of types of pneumatic tires of different specifications.

In these performance tests, a pneumatic tire having a tire size of 205/55R16 91V was assembled on a 16×6.5 JJ regular rim, inflated to the regular internal pressure (200 kPa), and mounted on a test vehicle (1600 cc front-engine front-wheel-drive vehicle).

The braking performance on wet road surfaces was evaluated by measuring braking distance of the test vehicle from a speed of 100 km/h on a wet road surface test course covered in 1 mm of water. Then, index values based on the measured results were assigned, with the result of Conventional Example 1 being defined as the reference (100). In this evaluation, larger numerical values are preferable.

The braking performance on snow-covered road surfaces was evaluated by measuring braking distance of the test vehicle with an activated anti-lock braking system (ABS) from a speed of 40 km/h on a compacted snow covered test course. Then, index values based on the measured results were assigned, with the result of Conventional Example 1 being defined as the reference (100). In this evaluation, larger numerical values are preferable.

The turning performance on snow-covered road surfaces was evaluated by sensory evaluation by a test driver on turning stability when cornering while traveling at a speed of 40 km/h in the test vehicle on a snow-covered test course. Index values based on the sensory evaluation results were assigned, with the result of the pneumatic tire of Conventional Example 1 being defined as the reference (100). In the evaluation, larger index values indicate superior turning performance on snow-covered road surfaces.

The braking performance on dry road surfaces was evaluated by measuring braking distance of the test vehicle from a speed of 100 km/h on a dry road surface test course. Then, index values based on the measured results were assigned, with the result of Conventional Example 1 being defined as the reference (100). In this evaluation, larger numerical values are preferable.

The turning performance on dry road surfaces was evaluated by sensory evaluation by a test driver on turning stability when cornering while traveling at a speed of from 60 km/h to 100 km/h in the test vehicle on a flat and dry test course. Index values based on the sensory evaluation results were assigned, with the result of the pneumatic tire of Working Example 11 being defined as the reference (100). In the evaluation, larger index values indicate superior turning performance on dry road surfaces.

The uneven wear resistance performance on dry road surfaces was evaluated by measuring uneven wear (the difference in the amount of wear on the tread surface between the rib-like land portions on the side and the other rib-like land portions) on rib-like land portions after traveling 50000 km in the test vehicle at an average speed of 60 km/h. Then, index values based on the measured results were assigned, with the result of Working Example 11 being defined as the reference (100). In the evaluation, larger index values indicate superior uneven wear resistance performance.

The pneumatic tire of Conventional Example 1 indicated in Table 1 includes four circumferential grooves (main grooves) and the first auxiliary grooves 5A and the second auxiliary grooves 5B pass through the circumferential grooves. The pneumatic tire of Conventional Example 1 has a configuration in which the first auxiliary grooves 5A and the second auxiliary grooves 5B have an alternating arrangement. The pneumatic tire of Conventional Example 1 includes two narrow grooves on the side on which the first auxiliary grooves 5A are disposed and two narrow grooves on the side on which the second auxiliary groove 5B is disposed. In the pneumatic tire of Conventional Example 1, the length of the narrow grooves on the side on which the second auxiliary grooves 5B are disposed are equal. In the pneumatic tire of Conventional Example 1, the length a of the narrow grooves 6F1 on the side on which the second auxiliary grooves 5B are disposed is equal to the length W2 of the second auxiliary groove 5B, and the length b of the narrow grooves 6F2 on the side on which the second auxiliary grooves 5B are disposed is equal to the length a of the narrow grooves 6F1. In the pneumatic tire of Conventional Example 1, the narrow grooves 6E, 6F1, 6F2 have a rectilinear shape. In the pneumatic tire of Conventional Example 1, the narrow grooves 6E are orientated in the same direction as the narrow grooves 6F1, 6F2. In the pneumatic tire of Conventional Example 1, the length W1 of the first auxiliary groove 5A and the length W2 of the second auxiliary groove 5B are equal. In the pneumatic tire of Conventional Example 1, the first auxiliary grooves 5A are located on the vehicle inner side and the second auxiliary grooves 5B are located on the vehicle outer side. In the pneumatic tire of Conventional Example 1, the width of the narrow grooves is 0.8 mm.

The pneumatic tires of Working Examples 1 to 13 include two circumferential grooves (main grooves), and the first auxiliary grooves 5A and the second auxiliary grooves 5B disposed in the fourth land portion 4D do not pass through the circumferential grooves (non-through). The pneumatic tires of Working Examples 14 to 16 include four circumferential grooves (main grooves), and the first auxiliary grooves 5A and the second auxiliary grooves 5B disposed in the fourth land portion 4D communicate with the circumferential grooves.

The pneumatic tires of the Working Example 1 to 16 have a configuration in which the first auxiliary grooves 5A and the second auxiliary grooves 5B have an alternating arrangement in the fourth land portion 4D. The pneumatic tires of Working Examples 1 to 13 include one narrow groove on the side on which the first auxiliary grooves 5A are disposed and two narrow grooves on the side on which the second auxiliary grooves 5B are disposed. The pneumatic tires of Working Examples 14 to 16 include two narrow grooves on both sides.

In the pneumatic tire of Working Example 1, the length of the narrow grooves on the side on which the second auxiliary grooves 5B are disposed are equal. In the pneumatic tires of Working Examples 2 to 16, the lengths of the narrow grooves on the side on which the second auxiliary grooves 5B are disposed are different (vary in length).

In the pneumatic tires of Working Example 1 and 2, the length a of the narrow grooves 6F1 on the side on which the second auxiliary grooves 5B are disposed is equal to the length W2 of the second auxiliary grooves 5B. In the pneumatic tires of Working Examples 3 to 16, the length a of the narrow grooves 6F1 on the side on which the second auxiliary grooves 5B are disposed are, compared to the length W2 of the second auxiliary grooves 5B, one of 30% (0.3*W2), 40% (0.4*W2), 50% (0.5*W2), 70% (0.7*W2), and 80% (0.8*W2).

In the pneumatic tires of Working Examples 1 to 7, the length b of the narrow grooves 6F2 on the side on which the second auxiliary grooves 5B are disposed is equal to the length a of the narrow grooves 6F1. In the pneumatic tires of Working Examples 8 to 16, the length b of the narrow grooves 6F2 on the side on which the second auxiliary grooves 5B are disposed are, compared to the length a of the narrow grooves 6F1, one of 60% (0.6*a), 70% (0.7*a), 80% (0.8*a), and 90% (0.9\*a).

In the pneumatic tires of Working Examples 1 to 11, the narrow grooves 6E, 6F1, 6F2 have a rectilinear shape. In the pneumatic tires of Working Examples 12 to 16, the narrow grooves 6E, 6F1, 6F2 have a curved shape.

In the pneumatic tires of Working Examples 1 to 12, the narrow grooves 6E are orientated in the same direction as the narrow grooves 6F1, 6F2. In the pneumatic tires of Working Examples 13 to 16, the narrow grooves 6E have a reverse orientation to that of the narrow grooves 6F1, 6F2.

In the pneumatic tires of Working Examples 1 to 13, the length W1 of the first auxiliary grooves 5A is equal to the length W2 of the second auxiliary grooves 5B. In the pneumatic tires of Working Examples 14 to 16, the length W1 of the first auxiliary grooves 5A and the length W2 of the second auxiliary grooves 5B have the following relationship:

$$W1 \leq W2.$$

In the pneumatic tires of Working Examples 1 to 14, the first auxiliary grooves 5A are located on the vehicle inner side and the second auxiliary grooves 5B are located on the vehicle outer side. In the pneumatic tires of Working Example 15 and 16, the first auxiliary grooves 5A are located on the vehicle outer side and the second auxiliary grooves 5B are located on the vehicle inner side.

In the pneumatic tires of Working Examples 1 to 15, the narrow grooves have a width of 1.3 mm. In the pneumatic tire of Working Example 16, the narrow grooves have a width of 0.6 mm.

Note that the pneumatic tire of Comparative Example 1 indicated in Table 1 includes two circumferential grooves (main grooves) and the first auxiliary grooves 5A and the second auxiliary grooves 5B do not pass through the circumferential grooves. The pneumatic tire of Comparative Example 1 has a configuration in which only one of the first auxiliary grooves 5A and the second auxiliary grooves 5B are disposed on only one side. The pneumatic tire of Comparative Example 1 includes one narrow groove on the side on which the first auxiliary grooves 5A are disposed and one narrow groove on the side on which the second auxiliary groove 5B is disposed. In the pneumatic tire of Comparative Example 1, the length of the narrow grooves on the side on which the second auxiliary grooves 5B are disposed are equal. In the pneumatic tire of Comparative Example 1, the length a of the narrow grooves 6F1 on the side on which the second auxiliary grooves 5B are disposed is equal to the length W2 of the second auxiliary groove 5B, and the length b of the narrow grooves 6F2 on the side on which the second auxiliary grooves 5B are disposed is equal to the length a of the narrow grooves 6F1. In the pneumatic tire of Comparative Example 1, the narrow grooves 6E, 6F1, 6F2 have a curved shape. In the pneumatic tire of Comparative Example 1, the narrow grooves 6E are orientated in the same direction as the narrow grooves 6F1, 6F2. In the pneumatic tire of Comparative Example 1, the length W1 of the first auxiliary groove 5A and the length W2 of the second auxiliary groove 5B are equal. In the pneumatic tire of Comparative Example 1, the first auxiliary grooves 5A are located on the vehicle outer side. In the pneumatic tire of Comparative Example 1, the width of the narrow grooves is 0.6 mm.

As is evident from the test results indicated in Table 1, the pneumatic tires of Working Examples 1 to 16 had superior braking performance on wet road surfaces ("wet performance (braking ability)" in Table 1), braking performance on snow-covered road surfaces ("snow performance (braking ability)" in Table 1), braking performance on dry road surfaces ("dry performance (braking ability)" in Table 1. Additionally, the pneumatic tires of Working Examples 1 to 16 had superior turning performance on dry road surfaces ("dry performance (turnability)" in Table 1) and wear resistance performance on dry road surfaces ("wear resistance performance on dry road surfaces" in Table 1).

TABLE 1-1

| | Conventional Example 1 | Comparative Example 1 | Working Example 1 | Working Example 2 | Working Example 3 | Working Example 4 |
|---|---|---|---|---|---|---|
| Number of circumferential grooves | 4 | 2 | 2 | 2 | 2 | 2 |
| Form of first auxiliary grooves 5A in fourth land portion | Pass through | Non-through | Non-through | Non-through | Non-through | Non-through |
| Form of second auxiliary grooves 5B in fourth land portion | Pass through | Non-through | Non-through | Non-through | Non-through | Non-through |
| Arrangement of first auxiliary groove 5A and second auxiliary groove 5B | Alternating | Only one side | Alternating | Alternating | Alternating | Alternating |
| Number of narrow grooves on first auxiliary groove 5A side | 2 | 1 | 1 | 1 | 1 | 1 |
| Number of narrow grooves on second auxiliary groove 5B side | 2 | 1 | 2 | 2 | 2 | 2 |
| Length of narrow grooves on second auxiliary groove 5B side | Same | Same | Same | Varied | Varied | Varied |
| Length a of narrow groove 6F1 | Same as W2 | Same as W2 | Same as W2 | Same as W2 | 0.3 * W2 | 0.4 * W2 |
| Length b of narrow grooves 6F2 | Same as a | Same as a | Same as a | Same as a | Same as a | Same as a |
| Shape of narrow grooves | Rectilinear | Curved | Rectilinear | Rectilinear | Rectilinear | Rectilinear |
| Orientation of narrow grooves 6E to narrow grooves 6F1, 6F2 | Same direction | Same direction | Same direction | Same direction | Same direction | Same direction |
| Length W1 of first auxiliary groove 5A | W1 = W2 | W1 = W2 | W1 = W2 | W1 = W2 | W1 = W2 | W1 = W2 |
| Position of first auxiliary grooves 5A | Inner side | Outer side | Inner side | Inner side | Inner side | Inner side |
| Position of second auxiliary grooves 5B | Outer side | — | Outer side | Outer side | Outer side | Outer side |
| Width of narrow grooves | 0.8 mm | 0.6 mm | 1.3 mm | 1.3 mm | 1.3 mm | 1.3 mm |
| Wet performance (braking ability) | 100 | 100 | 103 | 103 | 103 | 103 |
| Snow performance (braking ability) | 100 | 100 | 103 | 101 | 102 | 102 |
| Dry performance (braking ability) | 100 | 105 | 101 | 103 | 101 | 103 |

|  |  |  |  |  |  |  |
|---|---|---|---|---|---|---|
| Dry performance (Turnability) | 100 | 101 | 101 | 103 | 103 | 103 |
| Wear resistance performance on dry road surfaces | 100 | 100 | 101 | 101 | 102 | 102 |

TABLE 1-2

|  | Working Example 11 | Working Example 12 | Working Example 13 | Working Example 14 | Working Example 15 | Working Example 16 |
|---|---|---|---|---|---|---|
| Number of circumferential grooves | 2 | 2 | 2 | 4 | 4 | 4 |
| Form of first auxiliary grooves 5A in fourth land portion | Non-through | Non-through | Non-through | Communicate | Communicate | Communicate |
| Form of second auxiliary grooves 5B in fourth land portion | Non-through | Non-through | Non-through | Communicate | Communicate | Communicate |
| Arrangement of first auxiliary groove 5A and second auxiliary groove 5B | Alternating | Alternating | Alternating | Alternating | Alternating | Alternating |
| Number of narrow grooves on first auxiliary groove 5A side | 1 | 1 | 1 | 2 | 2 | 2 |
| Number of narrow grooves on second auxiliary groove 5B side | 2 | 2 | 2 | 2 | 2 | 2 |
| Length of narrow grooves on second auxiliary groove 5B side | Varied | Varied | Varied | Varied | Varied | Varied |
| Length a of narrow groove 6F1 | 0.5 * W2 | 0.5 * W2 | 0.5 * W2 | 0.5 * W2 | 0.5 * W2 | 0.5 * W2 |
| Length b of narrow grooves 6F2 | 0.8 * a | 0.8 * a | 0.8 * a | 0.8 * a | 0.8 * a | 0.8 * a |
| Shape of narrow grooves | Rectilinear | Curved | Curved | Curved | Curved | Curved |
| Orientation of narrow grooves 6E to narrow grooves 6F1, 6F2 | Same direction | Same direction | Reverse orientation | Reverse orientation | Reverse orientation | Reverse orientation |
| Length W1 of first auxiliary groove 5A | W1 = W2 | W1 = W2 | W1 = W2 | W1 ≤ W2 | W1 ≤ W2 | W1 ≤ W2 |
| Position of first auxiliary grooves 5A | Inner side | Inner side | Inner side | Inner side | Outer side | Outer side |
| Position of second auxiliary grooves 5B | Outer side | Outer side | Outer side | Outer side | Inner side | Inner side |
| Width of narrow grooves | 1.3 mm | 1.3 mm | 1.3 mm | 1.3 mm | 1.3 mm | 0.6 mm |
| Wet performance (braking ability) | 104 | 105 | 106 | 107 | 107 | 110 |
| Snow performance (braking ability) | 104 | 105 | 106 | 107 | 107 | 110 |
| Dry performance (braking ability) | 105 | 106 | 107 | 108 | 109 | 110 |
| Dry performance (Turnability) | 105 | 106 | 107 | 107 | 108 | 108 |
| Wear resistance performance on dry road surfaces | 105 | 105 | 106 | 106 | 107 | 108 |

TABLE 1-3

|  | Working Example 5 | Working Example 6 | Working Example 7 | Working Example 8 | Working Example 9 | Working Example 10 |
|---|---|---|---|---|---|---|
| Number of circumferential grooves | 2 | 2 | 2 | 2 | 2 | 2 |

| | | | | | | |
|---|---|---|---|---|---|---|
| Form of first auxiliary grooves 5A in fourth land portion | Non-through | Non-through | Non-through | Non-through | Non-through | Non-through |
| Form of second auxiliary grooves 5B in fourth land portion | Non-through | Non-through | Non-through | Non-through | Non-through | Non-through |
| Arrangement of first auxiliary groove 5A and second auxiliary groove 5B | Alternating | Alternating | Alternating | Alternating | Alternating | Alternating |
| Number of narrow grooves on first auxiliary groove 5A side | 1 | 1 | 1 | 1 | 1 | 1 |
| Number of narrow grooves on second auxiliary groove 5B side | 2 | 2 | 2 | 2 | 2 | 2 |
| Length of narrow grooves on second auxiliary groove 5B side | Varied | Varied | Varied | Varied | Varied | Varied |
| Length a of narrow groove 6F1 | 0.7 * W2 | 0.8 * W2 | 0.5 * W2 | 0.5 * W2 | 0.5 * W2 | 0.5 * W2 |
| Length b of narrow grooves 6F2 | Same as a | Same as a | Same as a | 0.6 * a | 0.7 * a | 0.9 * a |
| Shape of narrow grooves | Rectilinear | Rectilinear | Rectilinear | Rectilinear | Rectilinear | Rectilinear |
| Orientation of narrow grooves 6E to narrow grooves 6F1, 6F2 | Same direction | Same direction | Same direction | Same direction | Same direction | Same direction |
| Length W1 of first auxiliary groove 5A | W1 = W2 | W1 = W2 | W1 = W2 | W1 = W2 | W1 = W2 | W1 = W2 |
| Position of first auxiliary grooves 5A | Inner side | Inner side | Inner side | Inner side | Inner side | Inner side |
| Position of second auxiliary grooves 5B | Outer side | Outer side | Outer side | Outer side | Outer side | Outer side |
| Width of narrow grooves | 1.3 mm | 1.3 mm | 1.3 mm | 1.3 mm | 1.3 mm | 1.3 mm |
| Wet performance (braking ability) | 103 | 103 | 104 | 104 | 104 | 104 |
| Snow performance (braking ability) | 103 | 103 | 104 | 104 | 104 | 104 |
| Dry performance (braking ability) | 104 | 104 | 104 | 104 | 104 | 105 |
| Dry performance (Turnability) | 103 | 104 | 103 | 104 | 105 | 105 |
| Wear resistance performance on dry road surfaces | 103 | 103 | 103 | 103 | 104 | 104 |

The invention claimed is:

1. A pneumatic tire comprising:
an inner circumferential groove and an outer circumferential groove provided in a tread portion and extending in a tire circumferential direction;
a land portion between circumferential grooves defined by the inner circumferential groove and the outer circumferential groove;
the land portion between circumferential grooves being located on a tire equatorial plane and being provided with:
a plurality of first auxiliary grooves disposed in the tire circumferential direction that communicate with the outer circumferential groove and terminate within the land portion between circumferential grooves, and
a plurality of second auxiliary grooves disposed in the tire circumferential direction that communicate with the inner circumferential groove and terminate within the land portion between circumferential grooves, wherein the plurality of first auxiliary grooves and the plurality of second auxiliary grooves have a non-intersecting alternating arrangement;
at least one narrow groove between first auxiliary grooves disposed between adjacent first auxiliary grooves of the plurality of first auxiliary grooves; and
at least two narrow grooves between second auxiliary grooves disposed between adjacent second auxiliary grooves of the plurality of second auxiliary grooves, the at least two narrow grooves between second auxiliary grooves being disposed in a greater number than the number of the at least one narrow groove between first auxiliary grooves;
wherein W1<W2 is satisfied, where W1 is a length of the plurality of the first auxiliary grooves disposed in the land portion between the circumferential grooves, and W2 is a length of the plurality of the second auxiliary grooves disposed in the land portion between the circumferential grooves;

the first auxiliary grooves and the second auxiliary grooves incline with opposite orientations in the circumferential direction in the land portion between circumferential grooves; and the at least one narrow groove between the first auxiliary grooves and the at least two narrow grooves between the second auxiliary grooves curve in opposite orientations in the circumferential direction.

2. A pneumatic tire comprising:

an inner circumferential groove and an outer circumferential groove provided in a tread portion and extending in a tire circumferential direction;

a land portion between circumferential grooves defined by the inner circumferential groove and the outer circumferential groove;

the land portion between circumferential grooves being located on a tire equatorial plane and being provided with:

a plurality of first auxiliary grooves disposed in the tire circumferential direction that communicate with the outer circumferential groove and terminate within the land portion between circumferential grooves, and a plurality of second auxiliary grooves disposed in the tire circumferential direction that communicate with the inner circumferential groove and terminate within the land portion between circumferential grooves, wherein the plurality of first auxiliary grooves and the plurality of second auxiliary grooves have a non-intersecting alternating arrangement;

at least one narrow groove between first auxiliary grooves disposed between adjacent first auxiliary grooves of the plurality of first auxiliary grooves; and at least two narrow grooves between second auxiliary grooves disposed between adjacent second auxiliary grooves of the plurality of second auxiliary grooves, the at least two narrow grooves between second auxiliary grooves being disposed in a greater number than the number of the at least one narrow groove between first auxiliary grooves, the at least two narrow grooves between the second auxiliary grooves having different lengths than each other, and a longer narrow groove of the at least two narrow grooves between the second auxiliary grooves having a length a such that $0.4*W2 \leq a \leq 0.7*W2$, where W2 is a length of the plurality of second auxiliary grooves disposed in the land portion between the circumferential grooves; wherein the first auxiliary grooves and the second auxiliary grooves extend to the tire equatorial plane, the first auxiliary grooves have a curved shape extended outward a tire width direction and across the outer circumferential groove, a protruding direction in the circumferential direction of the curved shapes of the first auxiliary grooves of both sides of the inner circumferential groove is the same, the second auxiliary grooves have a curved shape extended outward the tire width direction and across the inner circumferential groove, and a protruding direction in the circumferential direction of the curved shapes of the second auxiliary grooves of both sides of the inner circumferential groove is the same.

3. A pneumatic tire comprising:

an inner circumferential groove and an outer circumferential groove provided in a tread portion and extending in a tire circumferential direction;

a land portion between circumferential grooves defined by the inner circumferential groove and the outer circumferential groove;

the land portion between circumferential grooves being located on a tire equatorial plane and being provided with:

a plurality of first auxiliary grooves disposed in the tire circumferential direction that communicate with the outer circumferential groove and terminate within the land portion between circumferential grooves, and a plurality of second auxiliary grooves disposed in the tire circumferential direction that communicate with the inner circumferential groove and terminate within the land portion between circumferential grooves, wherein: the plurality of first auxiliary grooves and the plurality of second auxiliary grooves have a non-intersecting alternating arrangement, a length of the plurality of second auxiliary grooves in the tire width direction is over 50% of width of the land portion between the circumferential grooves in the tire width direction, and the plurality of second auxiliary grooves communicate with the inner circumferential groove;

at least one narrow groove between first auxiliary grooves disposed between adjacent first auxiliary grooves of the plurality of first auxiliary grooves; and at least two narrow grooves between second auxiliary grooves disposed between adjacent second auxiliary grooves of the plurality of second auxiliary grooves, the at least two narrow grooves between second auxiliary grooves being disposed in a greater number than the number of the at least one narrow groove between first auxiliary grooves, and the at least two narrow grooves between the second auxiliary grooves having different lengths than each other with a longer narrow groove of the at least two narrow grooves coming into contact with a ground before a shorter narrow groove of the at least two narrow grooves when traveling in a forward direction;

wherein the first auxiliary grooves and the second auxiliary grooves incline with opposite orientations in the circumferential direction in the land portion between circumferential grooves; and the at least one narrow groove between the first auxiliary grooves and the at least two narrow grooves between the second auxiliary grooves curve in opposite orientations in the circumferential direction.

4. A pneumatic tire comprising:

an inner circumferential groove and an outer circumferential groove provided in a tread portion and extending in a tire circumferential direction;

a land portion between circumferential grooves defined by the inner circumferential groove and the outer circumferential groove;

the land portion between circumferential grooves being located on a tire equatorial plane and being provided with:

a plurality of first auxiliary grooves disposed in the tire circumferential direction that communicate with the outer circumferential groove and terminate within the land portion between circumferential grooves, and a plurality of second auxiliary grooves disposed in the tire circumferential direction that communicate with the inner circumferential groove and terminate within the land portion between circumferential grooves, wherein the plurality of first auxiliary grooves and the plurality of second auxiliary grooves have a non-intersecting alternating arrangement, and wherein the plurality of second auxiliary grooves communicate with the inner circumferential groove;

at least one narrow groove between first auxiliary grooves disposed between adjacent first auxiliary grooves of the plurality of first auxiliary grooves; and at least two narrow grooves between second auxiliary grooves disposed between adjacent second auxiliary grooves of the plurality of second auxiliary grooves, the at least two narrow grooves between second auxiliary grooves being disposed in a greater number than the number of the at least one narrow groove between first auxiliary grooves, and the at least two narrow grooves between the second auxiliary grooves having different lengths than each other;

wherein $0.7a \leq b \leq 0.9a$ is satisfied, where a is a length of a longer narrow groove of the at least two narrow grooves between the second auxiliary grooves, and b is a length of a shorter narrow groove of the at least two narrow grooves between the second auxiliary grooves;

the first auxiliary grooves and the second auxiliary grooves incline with opposite orientations in the circumferential direction in the land portion between circumferential grooves; and the at least one narrow groove between the first auxiliary grooves and the at least two narrow grooves between the second auxiliary grooves curve in opposite orientations in the circumferential direction.

5. A pneumatic tire comprising:

an inner circumferential groove and an outer circumferential groove provided in a tread portion and extending in a tire circumferential direction;

a land portion between circumferential grooves defined by the inner circumferential groove and the outer circumferential groove;

the land portion between circumferential grooves being located on a tire equatorial plane and being provided with:

a plurality of first auxiliary grooves disposed in the tire circumferential direction that communicate with the outer circumferential groove and terminate within the land portion between circumferential grooves, and a plurality of second auxiliary grooves disposed in the tire circumferential direction that communicate with the inner circumferential groove and terminate within the land portion between circumferential grooves, wherein the plurality of first auxiliary grooves and the plurality of second auxiliary grooves have a non-intersecting alternating arrangement;

at least one narrow groove between first auxiliary grooves disposed between adjacent first auxiliary grooves of the plurality of first auxiliary grooves; and at least two narrow grooves between second auxiliary grooves disposed between adjacent second auxiliary grooves of the plurality of second auxiliary grooves, the at least two narrow grooves between second auxiliary grooves being disposed in a greater number than the number of the at least one narrow groove between first auxiliary grooves, the at least two narrow grooves between the second auxiliary grooves having different lengths than each other, and a longer narrow groove of the at least two narrow grooves between the second auxiliary grooves having a length a such that $0.4*W2 \leq a \leq 0.7*W2$, where W2 is a length of the plurality of second auxiliary grooves disposed in the land portion between circumferential grooves;

wherein the first auxiliary grooves and the second auxiliary grooves extend to the tire equatorial plane;

the first auxiliary grooves and the second auxiliary grooves incline with opposite orientations in the circumferential direction in the land portion between circumferential grooves; and the at least one narrow groove between the first auxiliary grooves and the at least two narrow grooves between the second auxiliary grooves curve in opposite orientations in the circumferential direction.

6. The pneumatic tire according to claim 5, wherein $0.7a \leq b \leq 0.9a$ is satisfied, where a is a length of a longer narrow groove of the at least two narrow grooves between second auxiliary grooves with different lengths, and b is a length of a shorter narrow groove of the at least two narrow grooves between second auxiliary grooves.

7. The pneumatic tire according to claim 5, wherein the at least one narrow groove between first auxiliary grooves has a curved shape;

the curved shape of the at least one narrow groove between first auxiliary grooves and the curved shape of the at least two narrow grooves between second auxiliary grooves are disposed such that a protruding direction of one of the curved shapes faces a tire rotation direction and a recessing direction of the other curved shape faces the tire rotation direction; and distances in the tire circumferential direction between end portions on both sides in a tire width direction of the at least one narrow groove between the first auxiliary grooves and one of the at least two narrow grooves between the second auxiliary grooves are shorter than a distance in the tire circumferential direction between centers in the tire width direction of the at least one narrow groove between the first auxiliary grooves and the one of the at least two narrow grooves between the second auxiliary grooves.

8. The pneumatic tire according to claim 5, wherein $W1 \leq W2$ is satisfied, where W1 is a length of the plurality of first auxiliary grooves disposed in the land portion between circumferential grooves, and W2 is a length of the plurality of second auxiliary grooves disposed in the land portion between circumferential grooves.

9. The pneumatic tire according to claim 5, further comprising indicators provided on sidewall portions of the tire to indicate a vehicle inner side and a vehicle outer side of the pneumatic tire, wherein the plurality of first auxiliary grooves are disposed on the vehicle outer side in the tire width direction, and the plurality of second auxiliary grooves are disposed on the vehicle inner side in the tire width direction when the pneumatic tire is mounted on a vehicle.

10. The pneumatic tire according to claim 5, wherein the at least one narrow groove between first auxiliary grooves and the at least two narrow grooves between second auxiliary grooves have a groove width of from 0.4 mm to 1.2 mm.

11. The pneumatic tire according to claim 5, wherein the at least one narrow groove between the first auxiliary grooves and the at least two narrow grooves between the second auxiliary grooves do not extend to the tire equatorial plane.

12. The pneumatic tire according to claim 5, wherein:
the at least one narrow groove between the first auxiliary grooves is shorter than the first auxiliary grooves in the tire width direction in the land portion between the circumferential grooves; and
the at least two narrow grooves between the second auxiliary grooves are shorter than the second auxiliary grooves in the tire width direction in the land portion between circumferential grooves.

13. The pneumatic tire according to claim 5, wherein:
the first auxiliary grooves pass through the outer circumferential groove and extend to outward of the tire width direction; and
the second auxiliary grooves pass through the inner circumferential groove and extend to outward of the tire width direction.

14. The pneumatic tire according to claim 6, wherein:
the first auxiliary grooves have a curved shape extended outward a tire width direction and across the outer circumferential groove,
a protruding direction in the circumferential direction of the curved shapes of the first auxiliary grooves of both sides of the outer circumferential groove is the same,
the second auxiliary grooves have a curved shape extended outward the tire width direction and across the inner circumferential groove, and
a protruding direction in the circumferential direction of the curved shapes of the second auxiliary grooves of both sides of the inner circumferential groove is the same.

15. The pneumatic tire of claim 14, wherein:
the first auxiliary grooves have a curved shape extended outward a tire width direction and across one of the outer circumferential groove,
a protruding direction in the circumferential direction of the curved shapes of the first auxiliary grooves of both sides of the outer circumferential groove is the same,
the second auxiliary grooves have a curved shape extended outward the tire width direction and across the inner circumferential groove, and
the protruding direction in the circumferential direction of the curved shapes of the second auxiliary grooves of both sides of the inner circumferential groove is the same.

* * * * *